United States Patent
Ottavj

(10) Patent No.: US 11,356,377 B2
(45) Date of Patent: Jun. 7, 2022

(54) DISTRIBUTION METHOD FOR A CONNECTION WITH MULTIPLE AND HETEROGENOUS LINKS

(71) Applicant: OneAccess, Clamart (FR)

(72) Inventor: Luc Ottavj, Valbonne (FR)

(73) Assignee: OneAccess, Clamart (FR)

( * ) Notice: Subject to any disclaimer, the term of this patent is extended or adjusted under 35 U.S.C. 154(b) by 0 days.

(21) Appl. No.: 15/312,703

(22) PCT Filed: May 21, 2015

(86) PCT No.: PCT/FR2015/051334
§ 371 (c)(1),
(2) Date: Nov. 21, 2016

(87) PCT Pub. No.: WO2015/177471
PCT Pub. Date: Nov. 26, 2015

(65) Prior Publication Data
US 2017/0149676 A1    May 25, 2017

(30) Foreign Application Priority Data
May 23, 2014 (FR) ................................. 1454645

(51) Int. Cl.
*H04L 47/36* (2022.01)
*H04L 45/30* (2022.01)
*H04L 45/302* (2022.01)

(52) U.S. Cl.
CPC ............ *H04L 47/36* (2013.01); *H04L 45/306* (2013.01)

(58) Field of Classification Search
CPC .............................. H04L 47/36; H04L 45/306
See application file for complete search history.

(56) References Cited

U.S. PATENT DOCUMENTS

| | | | |
|---|---|---|---|
| 7,283,541 B2* | 10/2007 | Michelson | ........ H04L 29/06027 370/235 |
| 7,490,346 B2* | 2/2009 | Alao | ........... H04N 21/84 725/151 |
| 8,634,431 B1* | 1/2014 | Chiang | ........... H04L 47/621 370/395.21 |
| 8,848,715 B2* | 9/2014 | Izenberg | ........... H04L 47/2441 370/392 |
| 9,882,805 B2* | 1/2018 | Thankappan | ........ H04L 45/125 |
| 2002/0122394 A1 | 9/2002 | Whitmore et al. | |

(Continued)

OTHER PUBLICATIONS

International Search Report dated Aug. 5, 2015.

*Primary Examiner* — Redentor Pasia
(74) *Attorney, Agent, or Firm* — Gerald E. Hespos; Michael J. Porco; Matthew T. Hespos

(57) ABSTRACT

The invention relates, in a packet transport communication network comprising a connection (5) between an input node (3) and an output node (4), said connection (5) being able to be established by at least two different paths comprising at least two heterogeneous links (L1-L3), to a distribution method for distributing an incoming packet toward one of said links (L1-L3), comprising the following steps: identifying an object coherently grouping together packets, determining the size of the identified object, sending an incoming packet over one of said links (L1-L3), chosen based on the size of the object to which the packet belongs.

20 Claims, 1 Drawing Sheet

(56) References Cited

U.S. PATENT DOCUMENTS

| | | | |
|---|---|---|---|
| 2002/0131413 A1* | 9/2002 | Tsao | H04L 47/10 370/392 |
| 2005/0111437 A1* | 5/2005 | Maturi | H04L 47/10 370/352 |
| 2006/0037072 A1* | 2/2006 | Rao | H04L 1/1854 726/14 |
| 2006/0256723 A1* | 11/2006 | Hellenthal | H04L 47/10 370/235 |
| 2008/0123531 A1* | 5/2008 | Gerkis | H04L 47/2441 370/235 |
| 2010/0061244 A1* | 3/2010 | Meier | H04L 47/29 370/236 |
| 2012/0071131 A1* | 3/2012 | Zisapel | H04L 63/1408 455/410 |
| 2013/0003741 A1* | 1/2013 | Singh | H04L 45/123 370/394 |
| 2013/0201927 A1* | 8/2013 | Masputra | H04L 47/60 370/329 |
| 2013/0204965 A1* | 8/2013 | Masputra | H04L 47/60 709/217 |
| 2013/0297816 A1* | 11/2013 | Chaturvedi | H04L 1/1848 709/231 |
| 2014/0126360 A1* | 5/2014 | Rong | H04W 28/0289 370/230 |
| 2014/0140209 A1* | 5/2014 | Shihada | H04L 49/9005 370/230 |
| 2014/0269277 A1* | 9/2014 | DeCusatis | H04L 47/365 370/230 |
| 2015/0341278 A1* | 11/2015 | Sundar | H04L 47/365 370/392 |
| 2016/0323190 A1* | 11/2016 | Testicioglu | H04L 47/52 |

\* cited by examiner

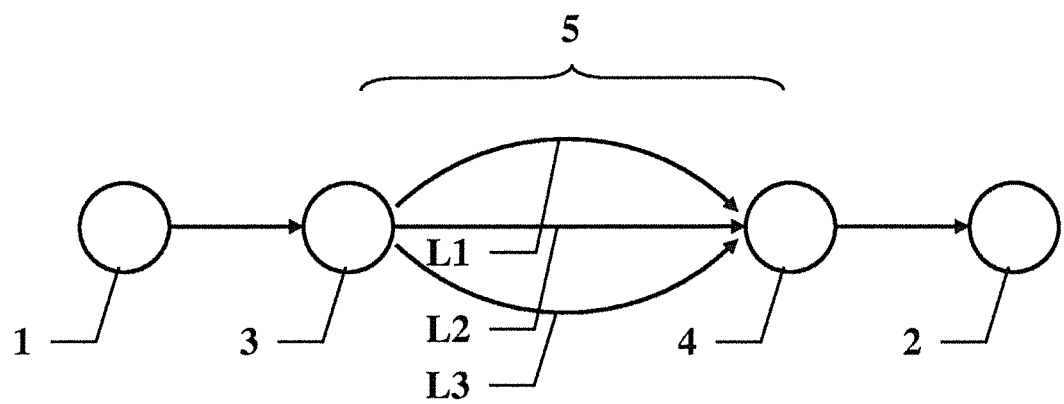

DISTRIBUTION METHOD FOR A CONNECTION WITH MULTIPLE AND HETEROGENOUS LINKS

BACKGROUND

1. Field of the Invention

The present invention relates to a method for routing packets in a communication network by packet transport. More particularly, the present invention addresses the problem of optimizing the use of a connection, between an input node and an output node, said connection including at least two heterogeneous paths, in that they use links having different characteristics, primarily in terms of time and/or throughput.

2. Description of the Related Art

In the case of a TCP protocol for example, a standard for a multi-path connection exists: Multi-Path TCP (MPTCP). This protocol defines how a stream and its packets can be adapted to be transmitted over the different paths and retrieved identically upon arrival. However, this standard remains silent about how to distribute the packets between the different paths and leaves the implementation free on this point.

Different methods are known, such as a round robin or weighted round robin method, circularly allocating the packets to the different starting links of the different paths, if applicable based on their capacity or availability.

However, in the case of heterogeneous paths having different characteristics, for example a path using an ADSL link, or a satellite link or a 3G or 4G link, such a distribution method most often proves relatively unprofitable in terms of user experience, in that the overall performance obtained with 2 or 3 paths assigned circularly may be improved little or not at all, or even downgraded, relative to the performance obtained with only one of these paths.

The present invention resolves these different drawbacks and proposes a method for distributing packets among at least two heterogeneous paths of a connection, making it possible to optimize the overall performance of the connection, in order to take advantage of the presence of multiple paths.

SUMMARY

The invention thus relates to a distribution method, for a packet transport communication network comprising a connection between an input node and an output node, said connection including at least two paths using heterogeneous links, to distribute an incoming packet toward one of said links, the method comprising the following steps:

identifying an object, grouping packets together coherently, among the incoming packets, determining the size of the identified object, sending an incoming packet onto one of said paths chosen based on the size of the object to which the packet belongs.

According to another feature, the step for identifying an object comprises determining the application protocol by analyzing at least one packet.

According to another feature, the step for identifying an object comprises an analysis of the time separating two successive incoming packets, a new object being considered when this time exceeds a given threshold.

According to another feature, the size of an object is discretized into a number of size classes, at least equal to the number of links, the choice of the path and therefore of the link being made based on the size class.

According to another feature, each size class is associated with an identifier, and each packet is marked with the identifier corresponding to the size of the object to which the packet belongs.

According to another feature, the step for determining the size of an object is carried out, a priori, by analyzing at least one of the packets of the object.

According to another feature, the step for determining the size of an object comprises an extraction of the content of one of the packets of the object.

According to another feature, the size of an object is deduced from the type of object.

According to another feature, the step for determining the size of an object is carried out incrementally, and comprises counting incoming packets belonging to the object.

According to another feature, the size of an object is considered to be as small as possible based on the number of incoming packets already received, until proven otherwise.

According to another feature, a packet of an object of at least one of the smallest sizes is sent over the path with the shortest time.

According to another feature, a packet of an object of at least one of the largest sizes is sent over the path with the highest throughput.

According to another feature, a packet of an object with an intermediate size is sent over one of the remaining paths chosen on a rotating basis.

Other features, details and advantages of the invention will emerge more clearly from the detailed description provided below for information, in relation to the drawings.

BRIEF DESCRIPTION OF THE DRAWINGS

FIG. 1 shows a typical environment of the invention.

DETAILED DESCRIPTION

According to FIG. 1, showing part of a communication network, here comprising four nodes 1-4, a source node 1 establishes a TCP communication with a receiving node 2 and sends data, divided into packets, to this receiving node 2. To that end, traditionally, a path is established from node to node between the source node 1 and the receiving node 2. Here for example, the path between the source node 1 and the receiving node 2 comprises both nodes 3, 4, but could comprise more. Over part of the path, which we will call connection 5, several paths are possible depending on whether one uses the links L1, L2 or L3. Using the term path Li to refer to the path using the link Li, and connection Li to refer to the TCP connection established between the node 3 and the node 4 using the path Li, one can see that the connection L5 can be done by a connection L1 or L2 or L3 or by all three connections simultaneously. In the context of the invention, the connection L5 is done by the three connections L1-L3 used simultaneously to transport the packets from the original connection between the nodes 1 and 2.

The invention applies to all types of link paths, including similar or identical heterogeneous paths. However, the method is more particularly suitable and performs better in the case of heterogeneous paths. "Heterogeneous paths"

here refers to paths using links whereof the features, in terms of time or throughput, are different, or even very different.

The connection 5 and the different links L1-L3 are framed by an input node 3 and an output node 4. The input node 3 is responsible for processing: sorting incoming packets, essentially modifying the headers of said packets and distributing said packets on one or the other of the connections L1-L3. The output node 4 is in charge of receiving packets from the different connections L1-L3, restoring any modifications and resequencing packets before they are sent to the following node. The two input 3 and output 4 nodes intercept the packet and process them on the fly. The data stream leaving the output node 4 is substantially identical to the data stream entering the input node 3, so that the connection 5 and the input and output nodes 3, 4 are completely transparent for the end nodes 1, 2 and for a user.

Thus, most of the processing described herein is done by the input node 3 and/or the output node 4. The steps more particularly associated with the different steps of the method are carried out by the input node 3.

The input 3 and output 4 nodes can be implemented, for example, each by a performance enhanced proxy (PEP), as defined in documents RFC 3135 or RFC 3449 published by the IETF. These two PEPs are advantageously paired.

The optimized exchange protocol between the two PEPs consists of establishing, for each intercepted connection, as many connections as there are different links on the node 3. As indicated, this protocol may be MPTCP or any other protocol guaranteeing the resequencing of the packets of the original connection by the remote PEP.

The method according to the invention primarily relates to the distribution or breakdown of the incoming packets in the input node 3, and one or the other of the connections L1-L3 (and therefore links L1-L3) connecting the input node 3 to the output node 4. Thus, the method decides, for each packet, on which connection L1-L3 the packet must be sent to the output node 4.

The guiding principle is to send a packet on one of the connections L1-L3, said connection being chosen based on the size of the object to which the packet belongs.

For the needs of transmission over a communication network, all data is divided into a series of packets, of substantially the same size. Consequently, a datum or object is made up of a coherent set of packets. In order to facilitate their transport, these packets are separated and do not necessarily travel together. However, for the needs of the processing, and in order to avoid mechanisms that risk downgrading the performance, for example resending mechanisms, the packets of a same object are advantageously grouped together temporally upon reception by the output node 4.

Consequently, for each packet, the higher-level entity or object is sought, which gives a set of packets their coherence. Once an object is identified, one of the main features used by the method is the size of said object. This size can be counted in storage units, for example kilobytes, or number of packets. This size is used in a discriminatory manner to distribute a packet, advantageously together with the other packets of a same object, over one or the other of said connections L1-L3.

To that end, the distribution method comprises the following steps. A first step consists, for an incoming packet, of identifying the object to which said packet belongs. A second step, once the object is identified, consists of determining the size of the identified object and associating it with the packet. Lastly, during a third step, based on the size of the object to which the packet belongs, one of the links is chosen to send said packet from the input node 3 to the output node 4.

We will now describe the first identification step of the object.

According to one embodiment, the identification of an object is done by analyzing the content of at least one packet. This analysis comprises an analysis of one or several packet(s), their header and/or payload, in order to recognize the type of content and thus be able to detect an object. Once an object is detected, the analysis of the other packets may benefit therefrom and a new incoming packet will advantageously be tested to verify whether it belongs to an object previously detected.

According to one embodiment, the step for identifying an object passes through a prerequisite consisting of determining the application protocol. Such an approach requires knowledge of the different protocols, and for example a recognition dictionary making it possible to determine, based on the form of a packet, the application protocol from which it originates. Likewise, once the application protocol is determined, it is possible to determine the type of the object by recognition of a keyword, a command, or a particular field in a packet, known for a given protocol. This approach may be qualified as syntactic and is based on recognition of shapes present in a packet.

Such an approach is of course only possible if the content of the packets is readable in clear and is not possible for encrypted data, such as those used by secure protocols such as SSL, HTTPS, POPS, IMAPS, CIFS, SMTPS.

According to another embodiment, the identification of an object is done by analyzing durations separating the successive incoming packets. Thus, as long as the duration between two successive packets remains short, it is possible to consider that these two packets belong to a same object. On the contrary, if the duration between two successive packets becomes longer, until it exceeds a given threshold, it is considered that this involves an interval between two objects, and the second packet is considered to belong to a new object.

The time threshold used to that end is typically a configurable parameter. Its value may be determined by trial and error during an initialization phase. In the case of a TCP protocol, this threshold may be calculated from internal variables of the TCP stack. Thus, the round-trip delay time (RTT) parameter or its filtered sRTT ("smooth" RTT) version can be used to build a threshold $x*RTT$ or $x*sRTT$, with $x$ a configurable coefficient, generally strictly greater than 1.

Such an approach is applicable both to data in clear, such as those used by unsecured protocols like FTP, HTTP, POP, IMAP, SMTP, and encrypted data, such as those used by secure protocols such as SSL, HTTPS, POPS, IMAPS, CIFS, SMTPS.

We will now describe the second step for determining the size of the object.

Irrespective of the unit (kb or packet number) used to quantify the size of an object, this size is advantageously discretized into a number of size classes. These classes perform a partitioning of the positive numbers. The number of classes advantageously remains limited to several units and is at least equal to the number of links L1-L3. Thus, for a connection with 3 links, we will have at least three size classes: $[0, x1[$, $[x1, x2[$ and $[x2, +\infty[$, with $x1 < x2$, disjointed and covering all positive numbers (all sizes).

Such discretization of the size simplifies the distribution step of a packet, the choice of the link that may advantageously be made based on the size class.

According to one embodiment, an identifier is associated with each size class. Thus, the step for determining the size of the object containing a packet determines, for each packet, the size class to which it belongs and may associate the corresponding identifier with the packet.

Advantageously, such an identifier is used, during the determination step, to mark a packet based on the size or size class of the object to which the packet belongs.

Depending on the protocol and the form of the packets, such marking may be done in different ways. Thus, in TCP it is possible to use the DSCP field to assign it a size or size class identifier. Another approach is to include such an identifier in a metadata tag associated with said packet to be marked.

During the distribution step, the identifier determining an object size associated with the packet can be read again, and based on its value, the link L1-L3 to be used to convey the packet can be chosen.

Once an object is identified, the determination of the size of said object can be done in different ways.

According to a first embodiment, the packets are readable, recognizable in terms of application protocol and furthermore, at least one of the packets of an object includes an indication of the size of said object. In this case, it is possible to extract content from such a packet, indicative of the size of the object. The size can be directly extracted if one of the packets of the object contains a size parameter. The size can also be deduced indirectly if a content element of at least one packet is indicative of the size. Analyzing one or several packets thus makes it possible to obtain the size of the object.

According to this embodiment, the size is extracted from an element contained in one of the packets, advantageously one of the first packets of the object or repeated in all of the packets of the object. Thus, the size of the object is advantageously known by analyzing at least one packet. This case is referred to as "a priori" determination of the size.

According to this embodiment, the determination of the application protocol for example makes it possible to determine, for a direct approach, where and in what form a parameter indicating the size of the object is stored in a packet.

Alternatively, still according to this embodiment, determining the application protocol may make it possible to determine what types of objects one can expect to encounter in the data stream and how to identify an object or a type of object.

Thus, in the illustrative case of an HTTP application protocol, an object may be a GET, POST, etc. command, or a response in the form of an html page, xml, pdf, a style document, a script, an image, a video, etc. Once the HTTP protocol has been identified, knowledge of HTTP indicates where the keyword can be found that defines the type of object and thus makes it possible to identify the type of object.

The determination of the type of an object is essentially useful to determine the size of the object indirectly. Thus for example, an object of the command type most often has a smaller size, typically belonging to the smallest size class. Conversely, an object of the video type most often has a larger size. One embodiment may consist of determining the type of an object, and next, for example using a lookup table, determining a size based on the type of the object.

According to another embodiment of the step for determining the size of an object, it may not be possible or desirable to extract the size from the content of at least one packet. The impossibility may be due to the fact that the packets do not contain size information, whether direct or indirect, or due to the fact that said packets are not readable, as in the case of encrypted packets.

According to this other embodiment, the size of an object may be determined by counting the incoming packets. This case is referred to as "incremental" determination of the size of the object. In this case, once a packet belonging to a new object is detected, a counter is initialized and incremented upon each new entry of a packet of that object.

One advantage of this method is that it is applicable in a larger number of cases, and in particular to the case where the protocol uses encryption. One drawback of this method is that the size of the object is only known after the last packet of the object arrives, and therefore at the end. This may be detrimental inasmuch as it is generally not possible, especially in the case of large objects, to wait for the last packet to arrive to process the first incoming packets, and in particular to distribute them on one of the links L1-L3.

To offset this drawback, according to one advantageous feature, the method determines an object size for a packet, before the actual size is actually known, as follows. When a new object is identified, its size is considered to be as small as possible, as long as the number of incoming packets belonging to this object does not contradict this hypothesis and does not prove otherwise. Thus, the first packets are treated as if the size of the object was as small as possible. Once an additional packet, beyond said smallest size, is received, this hypothesis is invalidated and the following packets are treated as if the size of the object was larger. This is applied as long as this new hypothesis remains true. If this hypothesis again becomes false, a new, larger size is considered. And so forth, iteratively.

Thus, in the absence of a size class, the ith incoming packet is considered to belong to an object with size i+1 and is processed/distributed as such.

This feature is more advantageous with size classes.

In order to illustrate this embodiment, an example with 3 size classes is described. A first size class C1, or smaller size class, is defined for the size is comprised between 1 and n1 packets, a second size class C2 is defined for the size is comprised between n1+1 and n2, and a third size class C3, or larger size class, is defined for the size is comprised between n2+1 and +∞, with n1<n2, n1 and n2 integers. When a new object is detected, it is considered to be the smallest. Its first packets are therefore assigned a size class C1. This hypothesis can validly be selected for the first packets, until the n1th packet is received. However, if a n1+1th packet arrives, this hypothesis becomes false. It is proven that the size of the object does not belong to the class C1. Consequently, from the n1+1th packet, it is considered that the size of the object belongs to the class C2. This can be done until the potential arrival of a n2+1th packet. If a n2+1th packet is received, it is proven that the size of the object does not belong to the class C2. Consequently, from the n2+1th packet, it is considered that the size of the object belongs to the class C3. This class C3 being the last one, it may be applied to all of any subsequent packets.

The parameters n1, n2, n3 . . . np, determining the number and scope of the different classes, are configurable depending on the available links L1-L3 for a connection 5, and if applicable, depending on the characteristics of the conveyed data streams.

Thus, the estimation of the size of the object changes with time and the arrival of new packets. However, when a packet enters, it is possible to assign it a size or a size class and the packet can be distributed over the connections L1-L3 depending on this assigned estimated size.

Alternatively, when the size of an object is determined incrementally, it is possible to consider only two size classes. In this case, it is advantageous to keep only a smaller size class, for example C1 (sizes comprised between 0 and n1) and a large size class grouping together all of the other classes C2 . . . Cn (sizes comprised between n1+1 and +∞).

We will now describe the third step for choosing the connection and therefore the link to send a packet.

During the preceding steps, each incoming packet was associated with a parameter indicative of the size of the object to which it belongs. This packet can now be sent over one of the connections L1-L3 based on this size parameter.

According to a first embodiment, when a packet is associated with at least one of the smaller object sizes, this packet is advantageously sent over the link L1-L3 with the shortest time.

Thus for example, based on the implementation choices, a packet will be sent over the link with the shorter time if it is associated with a size belonging to the first class C1, or respectively if it is associated with a size belonging to the first two classes C1 or C2, etc.

Thus, the packets effectively belonging to the small objects or the first packets belonging to objects with a size determined incrementally are sent over the link with the shortest time.

According to another embodiment, when a packet is associated with at least one of the larger object sizes, this packet is advantageously sent over the connection L1-L3 with a higher throughput.

Thus for example, based on the implementation choices, a packet will be sent over the connection with a higher throughput if it is associated with a size belonging to the last class C3, or respectively if it is associated with a size belonging to the last two classes C2 or C3, etc.

Thus, the packets effectively belonging to the large objects, or the last packets belonging to objects whereof the size is determined incrementally, are sent over the connection with the higher throughput.

Next, all of the packets determined as belonging to objects with an intermediate size can be sent over one of the remaining connections L1-L3. An intermediate size here refers to a size not comprised in said at least one of the smaller sizes and not comprised in said at least one of the larger sizes. The remaining connections here are connections that have not been selected to send the packets belonging to objects whose size belongs to at least one of the smaller object sizes and that have not been selected to send the packets belonging to objects whose size belongs to at least one of the larger object sizes. If there are several connections thus remaining, a connection may be chosen in a round robin or weighted round robin manner.

We will now describe examples of quantitative gains observed by carrying out the invention on different multi-link configurations.

Considering a transmission of a data stream comprising an HTML page P of 191 kB, made up of 3 objects E1, E2, E3 with respective sizes 1K, 60K and 130K, and using connections established on paths chosen from among:
a satellite path with throughput 10 MB/s and time 700 ms,
an ADSL path with throughput 1 Mb/s and time 40 ms,
a 3G path with throughput 200 MB/s and time 100 ms.
The page P is fully transmitted in:
3.7 s with a mono satellite connection,
2 s with a mono ADSL connection,
8 s with a mono 3G connection.
By applying the invention, the page P is transmitted in:
1.4 s with a combined satellite+ADSL connection,
1.6 s with a combined satellite+3G connection.

One can thus see that a user equipped with a satellite subscription and an additional ADSL subscription obtains, with the invention, a gain by a factor close to 3 relative to a simple satellite connection, and a gain by a factor greater than 2 if he is equipped with a satellite subscription and an additional 3G subscription.

Likewise, a user equipped with a 3G subscription obtains, with the invention and an additional satellite subscription, a gain by a factor of 5.

Thus, in a combined satellite+ADSL configuration, satellite+3G configuration, respectively, the satellite connection is that having the higher throughput and sends the objects E2 and E3, and the 3G connection, respectively, is that having the shorter time and sends the object E1. It is assumed in this example that the threshold n1 of the first class C1 corresponds to an object size of 2 kB.

All of the above has been described considering only a single travel direction, from the input node 3 toward the output node 4. It is of course applicable, alternatively or additionally, to a reverse travel direction, the input node 3 becoming output node and the output node 4 becoming input node.

The invention claimed is:

1. A system for assisting the distribution of packets through a communication network, each packet belonging to a respective object of a plurality of objects, each object being made up of a coherent set of packets, the system comprising:
at least one input node,
at least one output node, and
a plurality of heterogeneous transmission paths (L1, . . . , L3) coupled to the input node and the output node, wherein
at least one input node receives packets to be distributed and identifies an object to which each packet belongs,
the at least one input node estimates a current size of the identified object and associates each identified object to a current class among a plurality of size classes (C1, . . . , C3) on the basis of the estimated current size of the identified object, and
the at least one input node associates at least one size class (C1, . . . , C3) to a path (L1, . . . , L3) among the plurality of heterogeneous transmission paths and
the at least one input node distributes to the output node each packet through one of the associated transmission paths, the one of the associated transmission paths being selected based on the identified object to which the packet belongs.

2. The system according to claim 1, wherein
each transmission path (L1, . . . , L3) have a latency and a throughput,
the smallest objects being associated to a smallest class (C1), and the largest objects being associated to a largest class (C3), and
the at least one input node associates at least the smallest class to the transmission path to the shortest latency and the largest class to the transmission path to the highest throughput.

3. The system according to claim 1, wherein for at least one object, at least one packet belonging to said object comprises an indication of the size of said object, and the at least one input node reads the size indication and determines a priori the size of the identified objects by using at least said size indication.

4. The system according to claim 1, wherein at least one object has a type, and the at least one input node reads said object type and determines the object size from at least the object type.

5. The system according to claim 1, wherein, for at least one object, the at least one input node counts the number of packets which belong to said object, and associates said object to a size class on the basis of said counted number of packets.

6. The system according to claim 5, wherein the at least one input node:
associates initially each object to a smallest class,
for each object associated to a current size class, when the number of packets which belong to said object exceeds a certain threshold, the at least one input node associates said object to another size class greater than the current size class.

7. The system according to claim 1, wherein
the at least one input node can read in clear at least one packet, and
the at least one input node reads the content, header and/or payload of said packet(s) readable in clear and recognize the type of content of said packet(s) readable in clear and associates said packet(s) readable in clear to the same object that other packets with the same type of content.

8. The system according to claim 1, wherein the at least one input node analyzes at least one incoming packet to determine an application protocol from which the at least one incoming packet originates, and identifies the object to which the at least one incoming packet belongs based on the determined application protocol.

9. The system according to claim 1, wherein the at least one input node:
analyzes the duration between two successive incoming packets, and
if said analyzed duration is smaller than a predetermined threshold, associates said successive incoming packets to the same object of the plurality of objects,
else associates the last packet of the two successive incoming packets to a new object, then the at least one input node resets a current size of the new object to zero then updates said current size of the new object on the basis of the last packet of the two successive incoming packets.

10. The system according to claim 1, wherein there are at least as many size classes as transmission paths.

11. A system for assisting the distribution of packets through a communication network, each packet belonging to a respective object of a plurality of objects, each object being made up of a coherent set of packets, the system comprising:
at least one input node
at least one output node, and
a plurality of heterogeneous transmission paths (L1, . . . , L3) coupled to the input node and the output node, wherein
at least one output node receives packets to be distributed and identifies an object to which each packet belongs,
the at least one output node estimates a current size of the identified object and associates each identified object to a current class among a plurality of size classes (C1, . . . , C3) on the basis of the estimated current size of the identified object, and
the at least one output node associates at least one size class (C1, . . . , C3) to a path (L1, . . . , L3) among the plurality of heterogeneous transmission paths and
the at least one output node distributes to the input node each packet through one of the associated transmission paths, the one of the associated transmission paths being selected based on the identified object to which the packet belongs.

12. The system according to claim 11, wherein
each transmission path (L1, . . . , L3) have a latency and a throughput,
the smallest objects being associated to a smallest class (C1), and the largest objects being associated to a largest class (C3), and
the at least one output node associates at least the smallest class to the transmission path to the shortest latency and the largest class to the transmission path to the highest throughput.

13. The system according to claim 11, wherein for at least one object, at least one packet belonging to said object comprises an indication of the size of said object, and the at least one output node reads the size indication and determines a priori the size of the identified objects by using at least said size indication.

14. The system according to claim 11, wherein at least one object has a type, and the at least one output node reads said object type and determines the object size from at least the object type.

15. The system according to claim 11, wherein, for at least one object, the at least one output node counts the number of packets which belong to said object, and associates said object to a size class on the basis of said counted number of packets.

16. The system according to claim 15, wherein the at least one output node:
associates initially each object to a smallest class,
for each object associated to a current size class, when the number of packets which belong to said object exceeds a certain threshold, the at least one output node associates said object to another size class greater than the current size class.

17. The system according to claim 11, wherein
the at least one output node can read in clear at least one packet, and
the at least one output node reads the content, header and/or payload of said packet(s) readable in clear and recognize the type of content of said packet(s) readable in clear and associates said packet(s) readable in clear to the same object that other packets with the same type of content.

18. The system according to claim 11, wherein the at least one output node analyzes at least one incoming packet to determine an application protocol from which the at least one incoming packet originates, and identifies the object to which the at least one incoming packet belongs based on the determined application protocol.

19. The system according to claim 11, wherein the at least one output node:
analyzes the duration between two successive incoming packets, and
if said analyzed duration is smaller than a predetermined threshold, associates said successive incoming packets to the same object of the plurality of objects,
else associates the last packet of the two successive incoming packets to a new object, then the at least one output node resets a current size of the new object to zero then updates said current size of the new object on the basis of the last packet of the two successive incoming packets.

20. The system according to claim 11, wherein there are at least as many size classes as transmission paths.

* * * * *